Mar. 27, 1923.
A. KOEHN
1,449,821
TRUSS CONSTRUCTION FOR AUTOMOBILE FRAMES
Filed Mar. 3, 1921
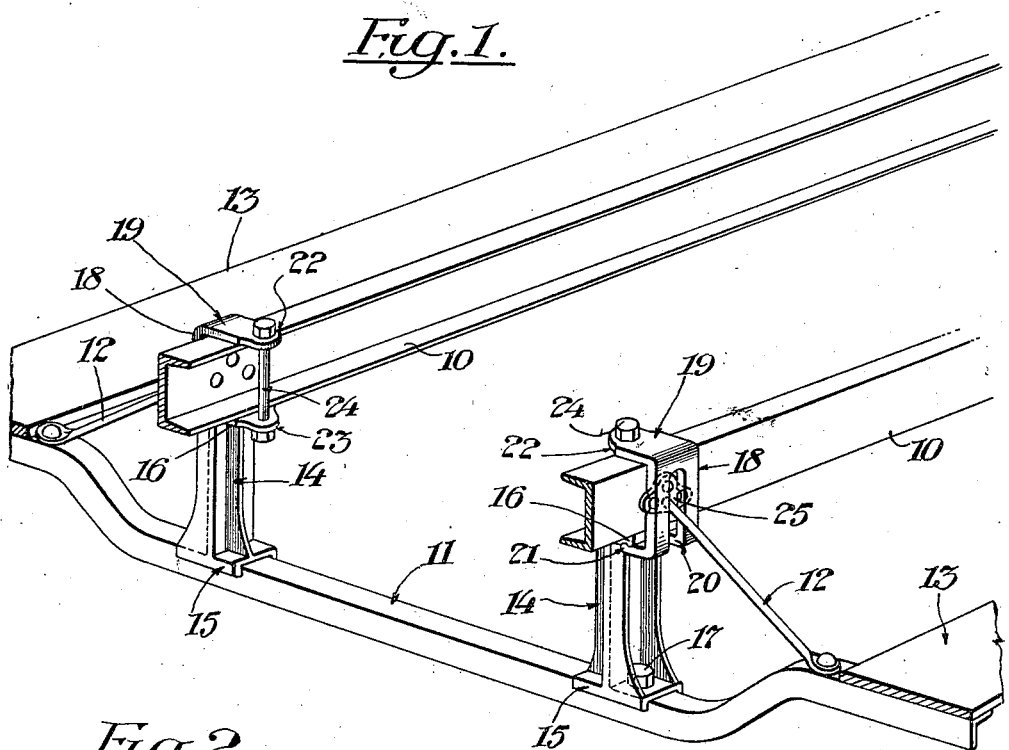
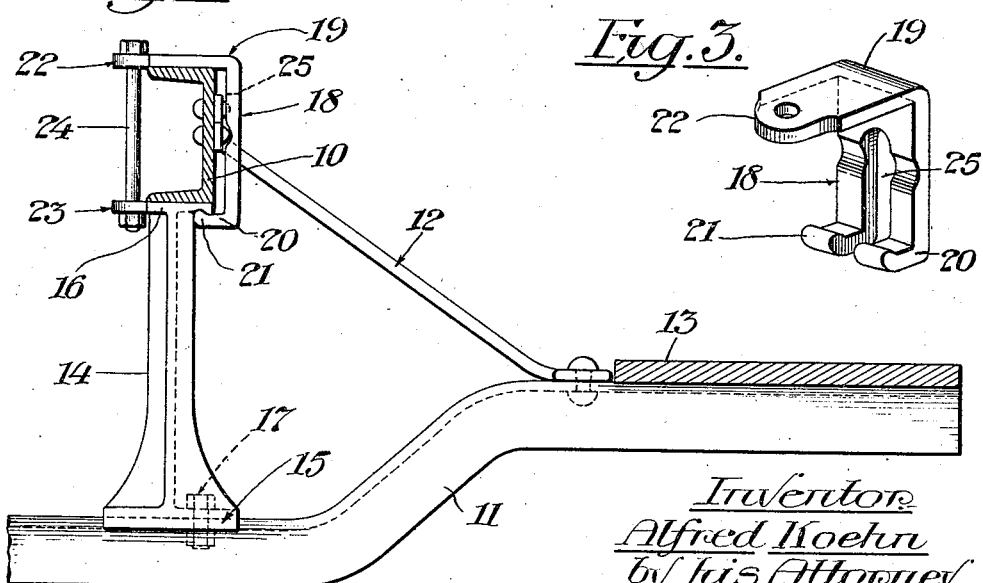
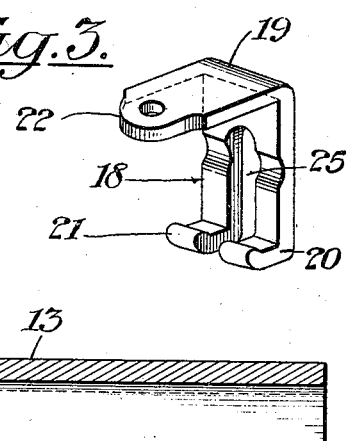
Inventor
Alfred Koehn
by his Attorney
John R. Nolan Patented Mar. 27, 1923.

1,449,821

UNITED STATES PATENT OFFICE.

ALFRED KOEHN, OF JERSEY CITY, NEW JERSEY.

TRUSS CONSTRUCTION FOR AUTOMOBILE FRAMES.

Application filed March 3, 1921. Serial No. 449,493.

*To all whom it may concern:*

Be it known that I, ALFRED KOEHN, citizen of the United States, and resident of Jersey City, in the county of Hudson and State of New Jersey, have invented certain new and useful Improvements in Truss Constructions for Automobile Frames, of which the following is a specification.

The object of this invention is is provide a simple and effective truss construction for use in connection with the longitudinal metal beams of an automobile frame, which construction not only supports the running boards of the vehicle in a stable manner and transmits the load thereon uniformly to the frame, but also prevents localization in the beams of the vibration due to the operation of the engine, thus reducing the otherwise liability of crystallization of the metal of the beams.

With this object in view the invention comprises, in an automobile, a truss construction having a brace bar spaced-below the beams and transversely of the vehicle, tie-rods secured to and between the beams and the bar, and struts of novel character secured to and between the bar and the respective beams.

The invention also comprises features of construction which will be hereinafter described and claimed.

In the drawings—

Figure 1 is a perspective view of a part of an automobile frame equipped with a truss construction embodying my invention.

Fig. 2 is a sectional elevation, enlarged, of one side of the frame and its associated parts.

Fig. 3 is a perspective view of one of the strut clamps detached.

Referring to the drawings, 10 designates the longitudinal beams of an automobile frame; 11 designates a transverse brace bar carried below the beams by diagonal tie rods 12 which are secured at their upper ends to the sides of the beams and at their lower ends to the end extensions of the bar, and 13 designates running boards supported upon the said extensions. Between the bar and the respective beams are interposed two stout vertical posts or struts 14, each having, in its preferred form, a channeled base portion 15 which is horizontally extended so as to bear upon and embrace a substantial part of the top of the bar, and having also a horizontally-extended head portion 16 which is firmly seated against the bottom of the proximate beam. The base portion 15 is secured to the bar by means, for example, of a bolt 17, and the head portion is coupled to the beam by a detachable clamp 18, the connections being such as to ensure a rigid and firm union of the three associated elements, viz: the beam, the strut and the brace bar.

The clamp, in its preferred form, comprises a metal body having upper and lower members 19, 20 which straddle the beam, the upper member bearing upon the top of the beam and the lower member engaging the under side of the strut head 16. The lower member is rounded, as at 21, to constitute a gripping jaw, and the under side of the head 16 is appropriately recessed to receive the jaw. The free end of the upper member is provided with a perforated lug 22 through which and a corresponding lug 23 on the strut head, passes a through bolt 24 in such a manner that the clamp can be firmly and securely held in place so as to bind the head 16 of the strut to the adjacent frame beam 10 without the use of rivets or the like. The body and lower member 20 of the clamp are slotted, as at 25, to permit it to receive and embrace the upper portion of the proximate tie rod 12, which rod serves as a means to ensure the accurate location of the clamp on the beam.

By the novel truss construction above-described the running boards of an automobile are effectually supported and the load thereon is uniformly transmitted through the tie-rods, bar and struts directly to the frame beams. Moreover, the vibration due to the operation of the engine is distributed generally throughout the frame beams and the strut and bar connections; thereby preventing localization of the vibration in, and reducing liability of crystallization of the metal of the beams.

I claim—

1. In an automobile, the combination with the longitudinal frame beams and the running boards, of a transverse brace bar positioned below said beams and having end extensions upon which the running boards are supported, diagonal tie-rods between the beams and the said extensions, struts interposed between the bar and the respective beams and having horizontally extended base and head portions which bear against the opposing surfaces of the bar and beams, and clamping means detachably securing the heads of the struts to the adjacent beams, each of the said head portions having a clamp seat and a bolt lug at the respective sides of the adjacent beam, and each clamping means comprising a vertical body located at one side of the beam, a member overhanging the beam, and a member underlying the beam and engaging the clamp seat of the head portion, together with a vertical bolt located at the opposite side of the beam and connecting the said overhanging member and bolt lug.

2. In an automobile, the combination with the longitudinal frame beams and the running boards, of a transverse brace bar positioned below said beams and having end extensions upon which the running boards are supported, diagonal tie-rods between the beams and the said extensions, struts between the bar and the respective beams, said struts having base and head portions seated against the opposing surfaces of the bar and beams, and clamps for the respective struts and beams, each of said clamps comprising a body having upper and lower members which embrace the adjacent beam and strut head, and a bolt connecting the upper member and the strut head.

3. In an automobile, the combination with the longitudinal frame beams and the running boards, of a transverse brace bar positioned below said beams and having end extensions upon which the running boards are supported, diagonal tie-rods between the beams and the said extensions, struts between the bar and the respective beams, said struts having base and head portions seated against the opposing surfaces of the bar and beams, and clamps for the respective struts and beams, each of said clamps comprising a body having upper and lower members which embrace the adjacent beam and strut head, and a bolt connecting the upper member and the strut head, the body and lower member of the clamp being slotted to receive the upper portion of the adjacent tie-rod.

Signed at New York in the county and State of New York this 2d day of March 1921.

ALFRED KOEHN.